United States Patent [19]

Yamazaki et al.

[11] 4,421,899
[45] Dec. 20, 1983

[54] PNEUMATIC TIRES HAVING IMPROVED DURABILITY

[75] Inventors: Noboru Yamazaki, Tokyo; Michio Okuyama, Kodaira; Seisuke Tomita, Higashimurayama, all of Japan

[73] Assignee: Bridgestone Tire Company Limited, Tokyo, Japan

[21] Appl. No.: 372,602

[22] Filed: Apr. 28, 1982

[30] Foreign Application Priority Data

May 11, 1981 [JP] Japan ................................. 56-69281

[51] Int. Cl.³ ............................................... C08L 81/00
[52] U.S. Cl. ................................ 525/189; 152/209 R; 152/330 R
[58] Field of Search ................. 152/209, 330; 525/189

[56] References Cited

U.S. PATENT DOCUMENTS 3,505,258 4/1970 Panek et al. ......................... 525/189
3,648,748 3/1972 Lovell .............................. 152/330 R Primary Examiner—Melvyn I. Marquis
Attorney, Agent, or Firm—Sughrue, Mion, Zinn, Macpeak and Seas

[57] ABSTRACT

A steel cord futed pneumatic tire having improved durability is disclosed. In this tire, a coating rubber for the belt and/or carcass ply comprises a rubber composition containing 2 to 10 parts by weight of a polysulfide polymer having the following general formula (I):

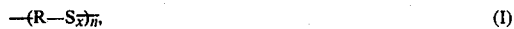

$$-(\!(R-S_x)\!)_{\overline{n}},\qquad (I)$$

wherein x is 3–6, R is $-(CH_2-CH_2-O)_{\overline{m}}CH_2-CH_2-$, m is 3–5 and n is 10–300, as a vulcanizing agent based on 100 parts by weight of rubber hydrocarbon consisting of at least 30% by weight of natural rubber or synthetic polyisoprene rubber or blends thereof.

2 Claims, No Drawings

PNEUMATIC TIRES HAVING IMPROVED DURABILITY

BACKGROUND OF THE INVENTION

1. Field of the Invention

This invention relates to steel cord belted radial pneumatic tires having improved durability comprising a rubber composition containing a novel vulcanizing agent as a coating rubber for the steel cords.

2. Description of the Prior Art

Lately, radial tires having low fuel consumption and excellent wear resistance has been widely used because of their energy- and fuel-savings properties. However, since steel cords are used as a reinforcement in these radial tires, troubles arise specifically problems in the durability of the tires due to the adhesion of rubber to steel cord arise, because the rubber composition is usually adhered to the steel cords during the vulcanization of the tire. In order to simultaneously and smoothly advance the adhesion reaction together with the vulcanization reaction, high-sulfur rubber compositions compounded with a tackifier such as cobalt salt, resorcin, hexamethylenetetramine or the like as a coating rubber for steel cords have been used. These coating rubbers can ensure adhesion to the steel cords, but are not preferable in terms of improvement of the durability of radial tire for the following reason.

That is, since the conventional coating rubber contains not less than 2 parts by weight of sulfur, the thermal aging resistance of the rubber is considerably poor, such that when the tire is run over a long period of time, polysulfide bond in the rubber changes into disulfide and monosulfide bonds. As a result, the network concentration and modulus of elasticity increase together with the running of the tire so as to deteriorate fatigue properties such as the breaking strength, the breaking extension and the like. Thus, cracks are produced and grow from a stress concentrated portion at the end portions of the steel cords to cause a so-called belt end separation. In order to improve this drawback, an attempt to improve the thermal aging resistance has been made by adding a vulcanization accelerator in an amount substantially equal to the sulfur compounding amount as in a so-called effective vulcanization. However, this attempt is no practical because the adhesion between the rubber and steel cord considerably lowers when using coating rubber for steel cords.

Furthermore, the blooming of the sulfur during the manufacture of the tires comes into question with coating rubber having a higher sulfur content. Since sulfur is poorly in the soluble rubber, when steel cords covered with a sulfur-containing rubber composition or so-called treatment cords are temporarily stored over about a week during the tire manufacturing step, a phenomenon of dissolving out the sulfur from the rubber arises and the sulfur crystallizes on the surface of the rubber. This is the so-called blooming phenomenon. In general, the tire is manufactured by laminating the treatment cords one upon the other at the tire building step, so that if sulfur is bloomed on the rubber surface, the tackiness between mutual rubbers considerably lowers and the lamination is made by insufficient adhesion. As a result, when the tire is used at a high temperature during the runing, the adhesion peeling or so-called separation failure is produced between the laminated steel cord reinforcing layers due to the insufficient durability of the coating rubber for the steel cords.

If the adhesion of the coating rubber to the steel cord as described above is improved, the thermal aging resistance of the coating rubber and the tackiness between the mutual coating rubbers are conversely degraded. Therefore, it is necessary to simultaneously improve such two contrary performances in order to improve the durability of the steel cord belted radial tire.

SUMMARY OF THE INVENTION

The inventors have made studies with respect to the application of sulfur compound to rubber compounding recipe and found that particular organic sulfur compounds simultaneously improve the two contrary performances and provide pneumatic tires having an excellent durability, and as a result the invention has been accomplished.

According to the invention, there is the provision of in a steel belted radial pneumatic tire having an improved durability, comprising a rubber composition containing a polysulfide polymer containing a polyether bond having the following general formula:

$$\text{\textensuremath{+}}R\text{\textemdash}S_x)_m \qquad (I),$$

wherein x is 3 to 6, R is $+(CH_2-CH_2+O)_mCH_2-CH_2-$, m is 3 to 5 and n is 10 to 300, in an amount as sulfur equivalent of 2.0 to 10 parts by weight per 100 parts by weight of rubber hydrocarbon consisting of at least 30% by weight of rubber selected from the group consisting of natural rubber, synthetic polyisoprene rubber and blends thereof used as a coating rubber for the belt and/or carcass ply.

DETAILED DESCRIPTION OF THE INVENTION

The rubber hydrocarbon to be used in the invention consists of 30 to 100% by weight of a rubber selected from natural rubber, synthetic polyisoprene rubber and blends thereof and 0 to 70% by weight of a different diene rubber such as styrene-butadiene copolymer rubber, polybutadiene rubber and the like.

The novel vulcanizing agent to be used in the invention is a polysulfide polymer expressed by the formula (I), which has an average polymerization degree of n=10–300 and a property from light yellow liquid to brown solid and is nonvolatile and odorless. When the average polymerization degree is less than 10, the resulting polymer is volatile, while when the average polymerization degree exceeds 300, the resulting polymer is poor in the compatibility with the rubber.

It is well-known that when the usual sulfur donor such as 4,4'-dithio-bis-dimorpholine (Sulfasan R, trade name, made by Monsanto Chemical Co., Ltd.), tetramethylthiuram disulfide or the like is used in the coating rubber for the steel cords, the resulting rubber composition is very stable to thermal fatigue during the running of the tire because elemental sulfur takes part in the vulcanization reaction to give a rubber-sulfur network bond of a monosulfide type which is stable even if the temperature of the tire rises in use after the vulcanization. However, such a rubber composition does not cause the adhesion reaction with the steel cords even if using a tackifier such as cobalt salt or the like and is considerably poor in mechanical fatigue properties, particularly flexing resistance against crack growth or the like at stress concentrated portions such as the steel cord end and the like, thus, it is not practical as the coating rubber for the steel cords in the pneumatic radial tires and hence the durability of the pneumatic tire is very insufficient.

On the other hand, when ordinary sulfur is added in an amount of not less than 2 parts by weight to 100 parts by weight of rubber and a tackifier such as cobalt salt, resorcin or the like is added thereto, the resulting rubber composition is excellent in adhesion between the rubber and the steel cord the crack propagation resistance. However, the adhesive power between the mutual rubbers is insufficient due to the reduction of tackiness that resulted from the blooming of the sulfur, which causes the separation failure. In addition, the polysulfide and disulfide bonds in the vulcanized sulfur network are decomposed to cause heat softening and reversion or is rebound to cause heat stiffening, which lowers the fracture properties. Such a deterioration of the thermal aging resistance leads to the reduction of durability in the pneumatic radial tire. Particularly, the improvement of durability is a significant technical problem in pneumatic steel radial tires for trucks and buses because the used tires having worn tread are generally retreaded by the revulcanization of the tread.

According to the invention, such a technical problem can easily be solved by using the polysulfide polymer containing a polyether bond expressed by the formula (I) as a vulcanizing agent. That is, the polysulfide polymer does not behave as elemental sulfur but chemically behaves as molecular sulfur during the vulcanization so that it does not prevent the adhesion reaction between the rubber and steel cord and consequently the adhesion to the steel cord is sufficiently achieved even in the rubber composition containing the tackifier even when using the ordinary sulfur. On the other hand, the polysulfide polymer provides substantially middle properties between the composition vulcanized with elemental sulfur and the composition vulcanized with molecular sulfur after the vulcanization. Therefore, such a vulcanization behavior of the polysulfide polymer imparts properties favorable as a coating rubber to the rubber composition for coating steel cords in the radial tire.

In the rubber composition according to the invention, the reason why the rubber hydrocarbon consists of at least 30% by weight of rubber selected from natural rubber, synthetic polyisoprene rubber and blends thereof is due to the fact that the natural rubber or synthetic polyisoprene rubber is excellent in fatigue properties and adhesion to steel cord, which are developed when the rubber hydrocarbon used as the coating rubber for the carcass ply and belt in the radial tire consists of not more than 30% by weight of natural rubber or synthetic polyisoprene rubber or blends thereof.

Moveover, it is known that the natural rubber or synthetic polyisoprene rubber is apt to cause sulfur blooming because the sulfur solubility is considerably low as compared with that of the other diene rubbers such as styrene-butadiene copolymer rubber or the like and that the resulting vulcanizate is poor in thermal aging resistance because the sulfur network of the vulcanizate contains a great number of polysulfide or disulfide bonds. Therefore, in order to solve the drawbacks of natural rubber or synthetic polyisoprene rubber by sulfur vulcanization, the polysulfide polymer containing a polyether bond according to the invention is used effectively.

According to the invention, it is apparent that the rubber composition containing the rubber hydrocarbon consisting of at least 30% by weight of natural rubber or synthetic polyisoprene rubber or blends thereof and the polysulfide polymer containing a polyether bond is effectively applicable as a coating rubber to the other tire members in addition to the steel cords.

In large-size radial tires for trucks and buses, the temperature rise of the tire tread becomes conspicuous under heavy load using conditions. In this connection, the conventional rubber compositions containing natural rubber or synthetic polyisoprene rubber and sulfur are poor in thermal aging resistance as previously mentioned and the fatigue properties are degraded such that durability becomes a problem. This results in the occurrence of cut failure, tread separation failure and the like during the running on unpaved road. On the contrary, according to the invention, the problem relating to durability can effectively be solved by compounding the polysulfide polymer containing a polyether bond into a tread rubber used for large-size truck and bus tires.

The rubber composition to be used in the invention contains a vulcanization accelerator, an accelerator activator such as zinc white, stearic acid or the like, and an antioxidant, which are usually used in the rubber industry, and may be compounded with a reinforcer such as carbon black, silica or the like and a softener.

The following example is given in illustration of the invention and is not intended as limitation thereof.

EXAMPLE

A polysulfide polymer inclusive of polyether bond was synthesized as follows.

To a solution of 30 g (0.13 mol) of 3,6,9-trioxaundecane-1,11-dithiol in dried ether (500 ml) was slowly added to a solution of 18 g (0.13 mol) of sulfur monochloride in dried ether (100 ml) at room temperature in a nitrogen atmosphere with stirring. Thereafter the resulting mixture was stirred for 24 hours to complete the reaction. Then, the reaction product was neturalized with triethylamine, washed with water, subjected to a separating treatment, concentrated in an evaporator and dried in a vacuum pump under a reduced press for 24 hours to obtain 37 g of a yellow candy substance.

This substance had an average molecular weight of 51,000 as measured by gel permeation chromatography and a total sulfur content of 42.42% as measured by the flask combustion method (calculated value: 44.46%). The substance was a polysulfide polymer expressed by the formula (I) wherein $X$ is 4, m is 3 and n is 177.

This polysulfide polymer was used as a vulcanizing agent to prepare a tire as follows.

Twelve steel radial tires for trucks and buses having a size of 10.00 R 20 were manufactured by using a rubber composition having a compounding recipe (part by weight) shown in the following Table 1 as a coating rubber for the belt or carcass ply and a combination of the coating rubber for the belt and the coating rubber for carcass ply as shown in the following Table 2, wherein an unvulcanized rubber treatment belt was produced by embedding in the coating rubber the belt composed of four ply layers, each layer containing steel cords arranged at a count of 13 cords/inch (25 mm) and each cord having a cord diameter of 1.19 mm and a twisting construction of $(1 \times 3) \times 0.20 + 6 \times 0.38$ using a steel filament plated with a brass consisting of 65% by weight of copper and 35% by weight of zinc. An unvulcanized rubber treatment carcass was produced by embedding in the coating rubber the carcass composed of one ply layer containing steel cords arranged at a count of 8 cords/inch (25 mm), each cord having a cord diameter of 1.2 mm and a twisting construction of $(1\times3+9\times15)\times0.175+1$ using a steel filament plate with a brass consisting of 70% by weight of copper and 30% by weight of zinc. These twelve tires were evaluated by the following test methods to obtain results as shown in the following Table 3.

The durabilities in the belt and carcass portions of the tire were evaluated by durable tests to heat separation and bead durability as follows:

Durable test to heat separation

The test tire was run on an indoor type drum at a speed of 55 km/hr under an internal pressure of 9 kg/cm$^2$ and a load of JIS 140% load. The tire was a distance until the failure of bead portion was measured.

Adhesive power test to steel cord

Samples were taken out from the belt and carcass portions of the test tire and then the peeling strength between the steel cord and rubber was measured. The result was indicated by peeling strength (kg) per cord.

As apparent from Table 3, in the pneumatic tires according to the invention, the durabilities of the belt and carcass portions are considerably improved and the good adhesive power is maintained even after the tire running test.

TABLE 1

| Compounding recipe No. | Example | | | | | | Comparative Example | | | |
|---|---|---|---|---|---|---|---|---|---|---|
| | 1 | 2 | 3 | 4 | 5 | 6 | 7 | 8 | 9 | 10 |
| Natural rubber | 100 | 50 | 15 | 50 | 50 | 50 | 50 | 50 | 50 | 50 |
| IR 2200 *1 | | | 20 | | | | | | | |
| SBR #1500 *1 | | 50 | 65 | 50 | 50 | 50 | 50 | 50 | 50 | 50 |
| Carbon black HAF | 50 | 50 | 50 | 50 | 50 | 50 | 50 | 50 | 50 | 50 |
| Zinc white #1 *2 | 8 | 8 | 8 | 8 | 8 | 8 | 8 | 8 | 8 | 8 |
| Cobalt stearate | 4 | 4 | 4 | 4 | 4 | 4 | 4 | 4 | 4 | 4 |
| N,N′—dicyclohexyl-2-benzotiazolylsulfeneamide *3 | 0.8 | 0.8 | 0.8 | 0.8 | 0.8 | 0.8 | 0.8 | 0.8 | 0.8 | 0.8 |
| 4,4′-dithio-bis-dimorpholine *4 | | | | | 5.55 | | | 14.8 | | |
| Sulfur | | | | 1.5 | | | 4.0 | | | |
| Polysulfide polymer | 9.4 | 9.4 | 9.4 | 5.9 | 5.9 | 5.9 | | | 30.0 | 3.5 |
| N—phenyl-N′—isopropyl-p-phenylenediamine | 1.0 | 1.0 | 1.0 | 1.0 | 1.0 | 1.0 | 1.0 | 1.0 | 1.0 | 1.0 |
| Sulfur equivalent of polysulfide polymer | 4.0 | 4.0 | 4.0 | 2.5 | 2.5 | 2.5 | | 4.0 | 13.0 | 1.5 |
| Total sulfur content | 4.0 | 4.0 | 4.0 | 4.0 | 4.0 | 2.5 | 4.0 | 4.0 | 13.0 | 1.5 |

*1 made by Japan Synthetic Rubber Co., Ltd.
*2 made by Mitsui Kinzoku Kogyo K.K.
*3 made by Ouchi Sinko Kagaku Kogyo K.K., Nocceler DZ (trade name)
*4 made by Monsanto Chemical Co., Ltd., Sulfasan R The test tire was run on an indoor type drum at a speed of 65 km/hr under an internal pressure of 7.25 kg/cm$^2$, during which a load was successively increased in accordance with the following load condition. The tire was run a distance until the failure of the tire was measured.

| Load condition | Running time |
|---|---|
| JIS 70% load | 7 hours |
| JIS 100% load | 13 hours |
| JIS 120% load | 24 hours |
| JIS 140% load | 24 hours |

Hereafter, the test tire ws run at a load increasing rate of 20% for 24 hours.

Test to bead durability

TABLE 2

| Tire No. | Example | | | | | | | | Comparative Example | | | |
|---|---|---|---|---|---|---|---|---|---|---|---|---|
| | 1 | 2 | 3 | 4 | 5 | 6 | 7 | 8 | 9 | 10 | 11 | 12 |
| Compounding recipe No. as a coating rubber for belt | 1 | 2 | 3 | 4 | 5 | 6 | 1 | 7 | 7 | 8 | 9 | 10 |
| Compounding recipe No. as a coating rubber for carcass ply | 1 | 2 | 3 | 4 | 5 | 6 | 7 | 1 | 7 | 8 | 9 | 10 |

TABLE 3

| Tire No. | Example | | | | | | | | Comparative Example | | | |
|---|---|---|---|---|---|---|---|---|---|---|---|---|
| | 1 | 2 | 3 | 4 | 5 | 6 | 7 | 8 | 9 | 10 | 11 | 12 |
| Durable test to heat separation (Km) | 8,500 | 8,100 | 7,700 | 8,200 | 8,000 | 8,800 | 8,400 | 6,700 | 6,500 | 5,000 | 6,600 | 5,000 |
| Test to bead durability (Km) | 48,000 | 50,000 | 47,500 | 51,000 | 50,000 | 52,000 | 33,000 | 50,000 | 32,000 | 31,000 | 30,000 | 29,000 |
| Adhesive power after durable test against heat separation (belt) (kg) | 4.65 | 4.20 | 4.15 | 5.45 | 4.15 | 4.10 | 4.75 | 4.05 | 4.05 | 0.40 metal exposure | 3.80 | 1.25 partial metal exposure |
| Adhesive power after test against bead durability (ply) (kg) | 5.40 | 4.75 | 4.50 | 5.45 | 4.75 | 4.55 | 4.50 | 5.55 | 4.50 | 2.25 partial metal exposure | 3.10 | 1.80 partial metal exposure |

What is claimed is:

1. A steel cord belted radial pneumatic tire having improved durability, comprising steel cords and a rubber composition comprising a polysulfide polymer, having a polyether bond therein, of the general formula I:

$$+R+S_x)_n, \quad (I)$$

wherein
x is 3 to 6, R is $+CH_2-CH_2-O)_{\overline{m}}-CH_2$, m is 3 to 5 and n is 10 to 300,
in an amount, an sulfur equivalent, of 2.0 to 10 parts by weight per 100 parts by weight of a rubber hydrocarbon consisting of at least 30% by weight of rubber selected from the group consisting of natural rubber, synthetic polyisoprene rubber and blends thereof, used as a coating rubber for the belt and/or carcass ply.

2. A steel cord belted radial pneumatic tire as in claim 1, wherein said rubber hydrocarbon additionally contains 0 to 70% by weight of a rubber selected from the group consisting of styrene-butadiene copolymer rubber and polybutadiene rubber.

* * * * *